United States Patent
Fujita

(10) Patent No.: US 8,803,714 B2
(45) Date of Patent: Aug. 12, 2014

(54) TRANSMITTING DEVICE AND RECEIVING DEVICE

(71) Applicant: Canon Kabushiki Kaisha, Tokyo (JP)

(72) Inventor: Yusuke Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/856,182

(22) Filed: Apr. 3, 2013

(65) Prior Publication Data

US 2013/0266087 A1 Oct. 10, 2013

(30) Foreign Application Priority Data

Apr. 10, 2012 (JP) ................... 2012-089417

(51) Int. Cl.
*H03M 9/00* (2006.01)

(52) U.S. Cl.
USPC ........... 341/100; 341/101; 375/295; 375/259; 375/316; 375/247; 375/286; 375/219; 375/240.28; 375/240.26; 375/E7.189; 370/352; 370/365; 370/366; 370/535; 370/536; 714/718; 714/719; 714/744

(58) Field of Classification Search
CPC ......... H03M 9/00; H04L 1/205; H04L 25/14; H04L 25/45; H04L 12/26; H04L 12/28; H04L 43/04; H04L 1/244; H04N 7/225; H04N 5/04; H04B 3/02; H04J 3/06; H04J 3/047; H04J 3/0611; G06F 13/00; G06F 13/42; G06F 15/8015; G11C 29/56
USPC .......... 341/100–101; 375/286, 366, 259, 354, 375/219, 247, 295, 240.28, 240.26; 370/365, 366, 352, 535, 536; 714/718, 714/719, 744
See application file for complete search history.

(56) References Cited

U.S. PATENT DOCUMENTS

| | | | |
|---|---|---|---|
| 6,791,483 B2 * | 9/2004 | Hattori | 341/101 |
| 6,847,692 B2 * | 1/2005 | Tokuhiro | 375/354 |
| 7,079,528 B2 * | 7/2006 | Ziegler et al. | 341/100 |
| 7,091,890 B1 * | 8/2006 | Sasaki et al. | 341/100 |
| 7,345,602 B2 * | 3/2008 | Saeki et al. | 341/100 |
| 7,372,380 B2 * | 5/2008 | Yoshikawa | 341/100 |
| 7,486,721 B2 * | 2/2009 | Chan et al. | 341/100 |
| 7,583,753 B2 * | 9/2009 | Okamura | 375/316 |
| 8,094,780 B2 * | 1/2012 | Jiang | 378/86 |
| 8,102,288 B2 * | 1/2012 | Koyanagi | 341/100 |
| 2007/0222650 A1 * | 9/2007 | Park et al. | 341/100 |
| 2012/0038497 A1 * | 2/2012 | Ku et al. | 341/100 |

FOREIGN PATENT DOCUMENTS

JP 2008-219930 A 9/2008

* cited by examiner

*Primary Examiner* — Lam T Mai
(74) *Attorney, Agent, or Firm* — Fitzpatrick, Cella, Harper & Scinto

(57) ABSTRACT

A transmitting device includes a parallel data generation unit and a transmitting unit. The parallel data generation unit generates first serial data and second serial data from a data packet, converts the first serial data and second serial data respectively into first parallel data and second parallel data, transmits the first parallel data and second parallel data respectively through first and second parallel transmission paths, and performs the transmission of the first parallel data and the transmission of the second parallel data in parallel. The transmitting unit receives the first parallel data and second parallel data respectively through the first and second parallel transmission paths, re-converts the first parallel data and second parallel data respectively into the first serial data and second serial data, and transmits the first serial data and second serial data to a receiving device respectively through first and second serial transmission paths.

18 Claims, 4 Drawing Sheets

FIG. 2

| BIT | 35 | 34~16 | 15~0 |
|---|---|---|---|
| USE | RW | ADDRESS (19 BITS) | CONTROL DATA (16 BITS) |

FIG. 3

| | | BIT | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|
| SERIAL DATA 0 | | DATA | 1 | 1 | 1 | 1 | 1 | 1 | 1 | 1 | 0 | RW | ADDRESS 4 (18th~17th BIT) | | 0 | ADDRESS 3 (16th~14th BIT) | | |
| | | USE | PACKET BOUNDARY IDENTIFICATION DATA | | | | | | | | ※ | | | | ※ | | | |
| | | | DATA WORD 0 | | | | | | | | DATA WORD 1 | | | | | | | |
| SERIAL DATA 1 | | BIT | 7 | 6 | 5 | 4 | 3 | 2 | 1 | 0 | 7 | 6 | 5 | 4 | 3 | 2 | 1 | 0 |
| | | DATA | | | | | | | | | | | | | 0 | | | |
| | | USE | ADDRESS 0 (7th~0th BIT) | | | | | | | | CONTROL DATA 1 (15th~8th BIT) | | | | ※ | | | |

| BIT | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|
| DATA | | | | | 0 | | | | | | | | 0 | | | |
| USE | ADDRESS 2 (13th~11th BIT) | | | | ※ | ADDRESS 1 (10th~8th BIT) | | | CONTROL DATA 0 (7th~0th BIT) | | | | | | | |

DATA WORD 2

※ NON-PACKET BOUNDARY IDENTIFICATION BIT

TRANSMITTING DEVICE AND RECEIVING DEVICE

BACKGROUND OF THE INVENTION

1. Field of the Invention

The present invention relates to a transmitting device which can transmit serial data and a receiving device which can receive the serial data.

2. Description of the Related Art

Such a serial data transmission system so as to add data indicating a data boundary to serial data to identify a data boundary is now discussed.

Such a serial data transmission system can be constructed in such a manner that output data is converted into data of a serial format by using a high frequency clock, before the output data is output to an outside. It can be also constructed in such a manner that the data indicating the data boundary is output from another terminal different from a terminal for the output data (refer to Japanese Patent Application Laid-Open No. 2008-219930).

In such a serial data transmission system, since the data indicating the data boundary is inserted into the serial data, there is such a problem that a data transmission efficiency deteriorates. Since it is necessary to assure wirings between the devices in order to transmit the data indicating the data boundary, there is such a problem that there arises a restriction in wiring around cables to attain wiring length equalization.

Furthermore, in such a serial data transmission system that a data transmission is performed through a plurality of serial transmission paths, it is demanded to enable the data transmission to be efficiently performed.

SUMMARY OF THE INVENTION

An aspect of the present invention is directed to overcome the above-described drawbacks and disadvantages.

Another aspect of the present invention is to attain that the data transmission can be efficiently performed in a serial data transmission system for transmitting data through a plurality of serial transmission paths.

According to another aspect of the present invention, there is provided a transmitting device comprising: a parallel data generation unit that generates first serial data and second serial data from a data packet, converts the first serial data into first parallel data, converts the second serial data into second parallel data, transmits the first parallel data through a first parallel transmission path, and transmits the second parallel data through a second parallel transmission path, wherein the transmission of the first parallel data and the transmission of the second parallel data are performed in parallel; and a transmitting unit that receives the first parallel data through the first parallel transmission path, receives the second parallel data through the second parallel transmission path, re-converts the first parallel data into the first serial data, re-converts the second parallel data into the second serial data, transmits the first serial data to a receiving device through the first serial transmission path, and transmits the second serial data to the receiving device through the second serial transmission path.

According to another aspect of the present invention, there is provided a receiving device comprising: a receiving unit that receives first serial data from a transmitting device through a first serial transmission path, receives second serial data from the transmitting device through a second serial transmission path, converts the first serial data into first parallel data, converts the second serial data into second parallel data, transmits the first parallel data through a first parallel transmission path, and transmits the second parallel data through a second parallel transmission path, wherein the transmission of the first parallel data and the transmission of the second parallel data are performed in parallel; and a restoring unit that receives the first parallel data through the first parallel transmission path, receives the second parallel data through the second parallel transmission path, inversely converts the first parallel data into the first serial data, inversely converts the second parallel data into the second serial data, and restores a data packet from the first serial data and the second serial data.

According to another aspect of the present invention, there is provided a method comprising: generating first serial data and second serial data from a data packet; converting the first serial data into first parallel data; converting the second serial data into second parallel data; transmitting the first parallel data through a first parallel transmission path; transmitting the second parallel data through a second parallel transmission path, wherein the transmission of the first parallel data and the transmission of the second parallel data are performed in parallel; receiving the first parallel data through the first parallel transmission path; receiving the second parallel data through the second parallel transmission path; re-converting the first parallel data into the first serial data; re-converting the second parallel data into the second serial data; transmitting the first serial data to a receiving device through the first serial transmission path; and transmitting the second serial data to the receiving device through the second serial transmission path.

According to another aspect of the present invention, there is provided a method comprising: receiving first serial data from a transmitting device through a first serial transmission path; receiving second serial data from the transmitting device through a second serial transmission path; converting the first serial data into first parallel data; converting the second serial data into second parallel data; transmitting the first parallel data through a first parallel transmission path; transmitting the second parallel data through a second parallel transmission path, wherein the transmission of the first parallel data and the transmission of the second parallel data are performed in parallel; receiving the first parallel data through the first parallel transmission path; receiving the second parallel data through the second parallel transmission path; inversely converting the first parallel data into the first serial data; inversely converting the second parallel data into the second serial data; and restoring a data packet from the first serial data and the second serial data.

According to another aspect of the present invention, there is provided a non-transitory computer-readable storage medium that stores a program for causing a computer to execute a method comprising: generating first serial data and second serial data from a data packet; converting the first serial data into first parallel data; converting the second serial data into second parallel data; transmitting the first parallel data through a first parallel transmission path; transmitting the second parallel data through a second parallel transmission path, wherein the transmission of the first parallel data and the transmission of the second parallel data are performed in parallel; receiving the first parallel data through the first parallel transmission path; receiving the second parallel data through the second parallel transmission path; re-converting the first parallel data into the first serial data; re-converting the second parallel data into the second serial data; transmitting the first serial data to a receiving device through the first serial transmission path; and transmitting the second serial data to the receiving device through the second serial transmission path.

According to another aspect of the present invention, there is provided a non-transitory computer-readable storage medium that stores a program for causing a computer to execute a method comprising: receiving first serial data from a transmitting device through a first serial transmission path; receiving second serial data from the transmitting device through a second serial transmission path; converting the first serial data into first parallel data; converting the second serial data into second parallel data; transmitting the first parallel data through a first parallel transmission path; transmitting the second parallel data through a second parallel transmission path, wherein the transmission of the first parallel data and the transmission of the second parallel data are performed in parallel; receiving the first parallel data through the first parallel transmission path; receiving the second parallel data through the second parallel transmission path; inversely converting the first parallel data into the first serial data; inversely converting the second parallel data into the second serial data; and restoring a data packet from the first serial data and the second serial data.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 2 is a diagram for illustrating an example of a data construction of a data block (36 bits) in the first exemplary embodiment.

FIG. 3 is a diagram for illustrating an example of a data construction of a data packet (48 bits) in the first exemplary embodiment.

DESCRIPTION OF THE EMBODIMENTS

Various exemplary embodiments, features, and aspects of the present invention will be described in detail below with reference to the drawings.

First Exemplary Embodiment

A serial data transmission system of the first exemplary embodiment will be described hereinbelow with reference to FIGS. 1 to 5.

Figure 1:
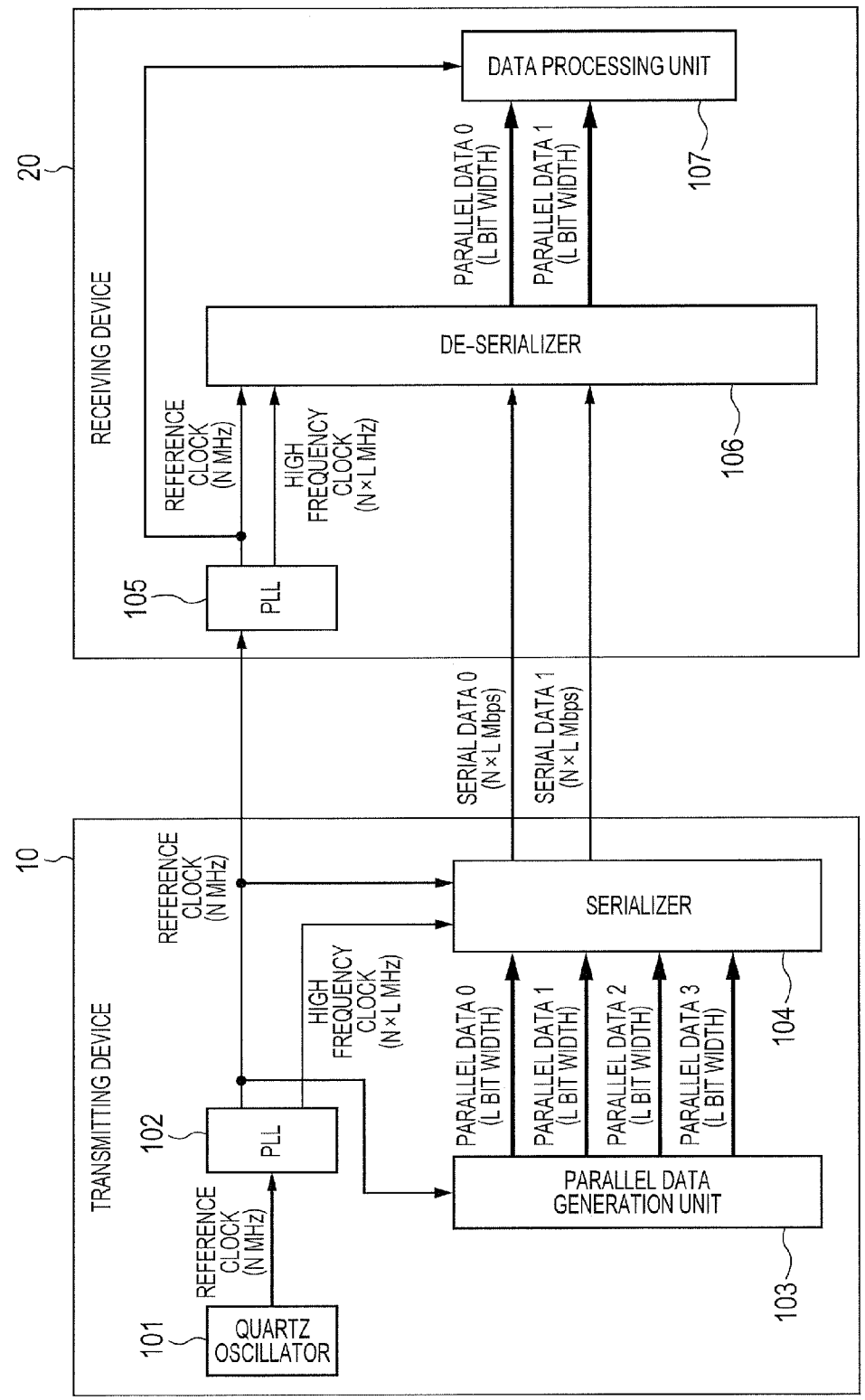
FIG. 1 is a block diagram for illustrating component elements included in a serial data transmission system in a first exemplary embodiment.

FIG. 1 is a block diagram for illustrating component elements included in the serial data transmission system of the first exemplary embodiment.

In FIG. 1, a transmitting device 10 has a quartz oscillator 101, a PLL (phase locked loop) circuit 102, a parallel data generation unit 103, and a serializer 104. A receiving device 20 has a PLL (phase locked loop) circuit 105, a de-serializer 106, and a data processing unit 107. For example, the transmitting device 10 is a device which acts as at least one of a digital camera, a digital video camera, a mobile phone, and a portable terminal. For example, the receiving device 20 is a device which acts as at least one of a storage device and a display device. The storage device includes a hard disk device, a memory card, a solid-state memory device, or the like.

The quartz oscillator 101 generates a reference clock and supplies the generated reference clock to the PLL circuit 102. The PLL circuit 102 generates a high frequency clock based on the reference clock supplied from the quartz oscillator 101, and locks a phase of the reference clock and a phase of the high frequency clock. For example, the PLL circuit 102 generates the high frequency clock by multiplexing a frequency of the reference clock by L times (where, L denotes a natural number and is assumed to be, for example, 8). The reference clock is supplied to the parallel data generation unit 103 and the serializer 104. The reference clock is supplied from the PLL circuit 102 to the receiving device 20 through a transmission path. The high frequency clock generated by the PLL circuit 102 is supplied from the PLL circuit 102 to the serializer 104.

The parallel data generation unit 103 operates synchronously with the reference clock supplied from the PLL circuit 102. The parallel data generation unit 103 generates a data block (36 bits) (refer to FIG. 2). The data block (36 bits) includes data to be transmitted from the transmitting device 10 to the receiving device 20. After the data block (36 bits) is generated, the parallel data generation unit 103 generates a data packet (48 bits) from the data block (36 bits) (refer to FIG. 3). After the data packet (48 bits) is generated, the parallel data generation unit 103 generates serial data 0 (24 bits) and serial data 1 (24 bits) from the data packet (48 bits). For example, the parallel data generation unit 103 divides data packet (48 bits) into two data, handles one of the two data as serial data 0 (24 bits), and handles the other of the two data as serial data 1 (24 bits).

FIG. 2 is a diagram for illustrating an example of a data construction of the data block (36 bits) in the first exemplary embodiment.

As shown in FIG. 2, the data block (36 bits) has an RW bit (1 bit), an address (19 bits), and control data (16 bits). The RW bit (1 bit) corresponds to a read/write identification bit. The address (19 bits) corresponds to address information indicating a predetermined area. The control data (16 bits) corresponds to data to be transmitted from the transmitting device 10 to the receiving device 20. The data construction shown in FIG. 2 is an example of the data construction of the data block (36 bits). Therefore, the data construction of the data block (36 bits) is not limited to the data construction shown in FIG. 2.

FIG. 3 is a diagram for illustrating an example of a data construction of the data packet (48 bits) in the first exemplary embodiment.

As shown in FIG. 3, the data packet (48 bits) has a packet boundary identification data (8 bits), a data block (36 bits), and four non-packet boundary identification bits (1 bit). The packet boundary identification data (8 bits) is one of boundary information, indicates a boundary between the data packet (48 bits) and other data, and indicates a start of the data packet (48 bits). As shown in FIG. 2, the data block (36 bits) has the RW bit (1 bit), the address (19 bits), and the control data (16 bits). The address (19 bits) included in the data block (36 bits) is divided into an address 0 (the 7th to 0th bits), an address 1 (the 10th to 8th bits), an address (the 13th to 11th bits), an address 3 (the 16th to 14th bits), and an address 4 (the 18th to 17th bits), and is stored in the data packet (48 bits). The control data (16 bits) included in the data block (36 bits) is divided into control data 0 (the 7th to 0th bits) and control data 1 (the 15th to 8th bits), and is stored in the data packet (48 bits). In FIG. 3, although a case where the non-packet boundary identification bit (1 bit) is equal to "0" will be illustrated, the non-packet boundary identification bit (1 bit) may be equal to a value other than "0".

The former half portion of the data packet (48 bits) corresponds to the serial data 0 (24 bits) constructed by three data words (8 bits). The latter half portion of the data packet (48 bits) corresponds to the serial data 1 (24 bits) constructed by three data words (8 bits). Therefore, in the first exemplary embodiment, the serial data 1 (24 bits) is handled as data which does not include the packet boundary identification data (8 bits).

The data word 0 (8 bits) of the serial data 0 (24 bits) has the packet boundary identification data (8 bits). In FIG. 3, a case where the packet boundary identification data (8 bits) is equal to "11111111" will be described. However, the packet boundary identification data (8 bits) may be equal to a value other than "11111111". The data word 0 (8 bits) of the serial data 1 (24 bits) has the address 0 (the 7th to 0th bits).

The data word 1 (8 bits) of the serial data 0 (24 bits) has the RW bit (1 bit), the address 3 (the 16th to 14th bits), the address 4 (the 18th to 17th bits), and the two non-packet boundary identification bits (1 bit). The two non-packet boundary identification bits (1 bit) are stored in the 7th and 3rd bits of the data word 1 (8 bits). The data word 1 (8 bits) of the serial data 1 (24 bits) has the control data 1 (the 15th to 8th bits).

The data word 2 (8 bits) of the serial data 0 (24 bits) has the address 1 (the 10th to 8th bits), the address 2 (the 13th to 11th bits), and the two non-packet boundary identification bits (1 bit). The two non-packet boundary identification bits (1 bit) are stored in the 7th and 3rd bits of the data word 2 (8 bits). The data word 2 (8 bits) of the serial data 1 (24 bits) has the control data 0 (the 7th to 0th bits).

The data construction shown in FIG. 3 is an example of the data construction of the data packet (48 bits). Therefore, the data construction of the data packet (48 bits) is not limited to the data construction shown in FIG. 3.

The parallel data generation unit 103 generates the data packet (48 bits) as shown in FIG. 3 in accordance with a predetermined control request. After the data packet (48 bits) is generated, the parallel data generation unit 103 generates the serial data 0 (24 bits) and the serial data 1 (24 bits) from the data packet (48 bits).

After the serial data 0 (24 bits) is generated from the data packet (48 bits), the parallel data generation unit 103 converts the serial data 0 (24 bits) into parallel data 0. For example, the parallel data generation unit 103 divides the serial data 0 (24 bits) into the three data words (8 bits), and generates the parallel data 0 having the three data words (8 bits). If the serial data 0 (24 bits) is divided into the three data words (8 bits), the parallel data 0 becomes parallel data having a width of 8 bits.

After the serial data 1 (24 bits) is generated from the data packet (48 bits), the parallel data generation unit 103 converts the serial data 1 (24 bits) into parallel data 1. For example, the parallel data generation unit 103 divides the serial data 1 (24 bits) into the three data words (8 bits), and generates the parallel data 1 having the three data words (8 bits). If the serial data 1 (24 bits) is divided into the three data words (8 bits), the parallel data 1 becomes parallel data having a width of 8 bits.

After the parallel data 0 and the parallel data 1 are generated, the parallel data generation unit 103 transmits the parallel data 0 to the serializer 104 through a parallel transmission path PL1, and transmits the parallel data 1 to the serializer 104 through a parallel transmission path PL2. The transmission of the parallel data 0 and the transmission of the parallel data 1 are performed in parallel at timing synchronized with the reference clock. The transmission of the parallel data 0 and the transmission of the parallel data 1 are performed in accordance with one of parallel transmission methods.

The serializer 104 receives the parallel data 0 from the parallel data generation unit 103 through the parallel transmission path PL1, and receives the parallel data 1 from the parallel data generation unit 103 through the parallel transmission path PL2. The serializer 104 re-converts the parallel data 0 into serial data 0 (24 bits), and transmits the serial data 0 (24 bits) to the receiving device 20 through a serial transmission path SL1. The serializer 104 re-converts the parallel data 1 into serial data 1 (24 bits), and transmits the serial data 1 (24 bits) to the receiving device 20 through a serial transmission path SL2. The transmission of the serial data 0 (24 bits) and the transmission of the serial data 1 (24 bits) are performed in parallel at timing synchronized with the high frequency clock. The transmission of the serial data 0 (24 bits) and the transmission of the serial data 1 (24 bits) are performed in accordance with one of serial transmission methods.

The PLL circuit 105 generates the high frequency clock based on the reference clock supplied from the PLL circuit 102, and locks a phase of the reference clock and a phase of the high frequency clock. For example, the PLL circuit 105 generates the high frequency clock by multiplexing the frequency of the reference clock by L times (where, L denotes a natural number and is assumed to be, for example, 8). The reference clock is supplied from the PLL circuit 105 to the de-serializer 106 and the data processing unit 107. The high frequency clock generated by the PLL circuit 105 is supplied from the PLL circuit 105 to the de-serializer 106.

The de-serializer 106 receives the serial data 0 (24 bits) from the transmitting device 10 through the serial transmission path SL1, and receives the serial data (24 bits) from the transmitting device 10 through the serial transmission path SL2. The reception of the serial data 0 (24 bits) and the reception of the serial data 1 (24 bits) are performed in parallel at timing synchronized with the high frequency clock.

The de-serializer 106 converts the serial data 0 (24 bits) into the parallel data 0. For example, the de-serializer 106 divides the serial data 0 (24 bits) into the three data words (8 bits), and generates parallel data 0 having the three data words (8 bits). If the serial data 0 (24 bits) is divided into the three data words (8 bits), the parallel data 0 becomes parallel data having a width of 8 bits.

The de-serializer 106 converts the serial data 1 (24 bits) into the parallel data 1. For example, the de-serializer 106 divides the serial data 1 (24 bits) into the three data words (8 bits), and generates parallel data 1 having the three data words (8 bits). If the serial data 1 (24 bits) is divided into the three data words (8 bits), the parallel data 1 becomes parallel data having a width of 8 bits.

After the parallel data 0 and the parallel data 1 are generated, the de-serializer 106 transmits the parallel data 0 to the data processing unit 107 through a parallel transmission path PL3, and transmits the parallel data 1 to the data processing unit 107 through a parallel transmission path PL4. The transmission of the parallel data 0 and the transmission of the parallel data 1 are performed in parallel at timing synchronized with the reference clock. The transmission of the parallel data 0 and the transmission of the parallel data 1 are performed in accordance with one of parallel transmission methods.

Figure 4:
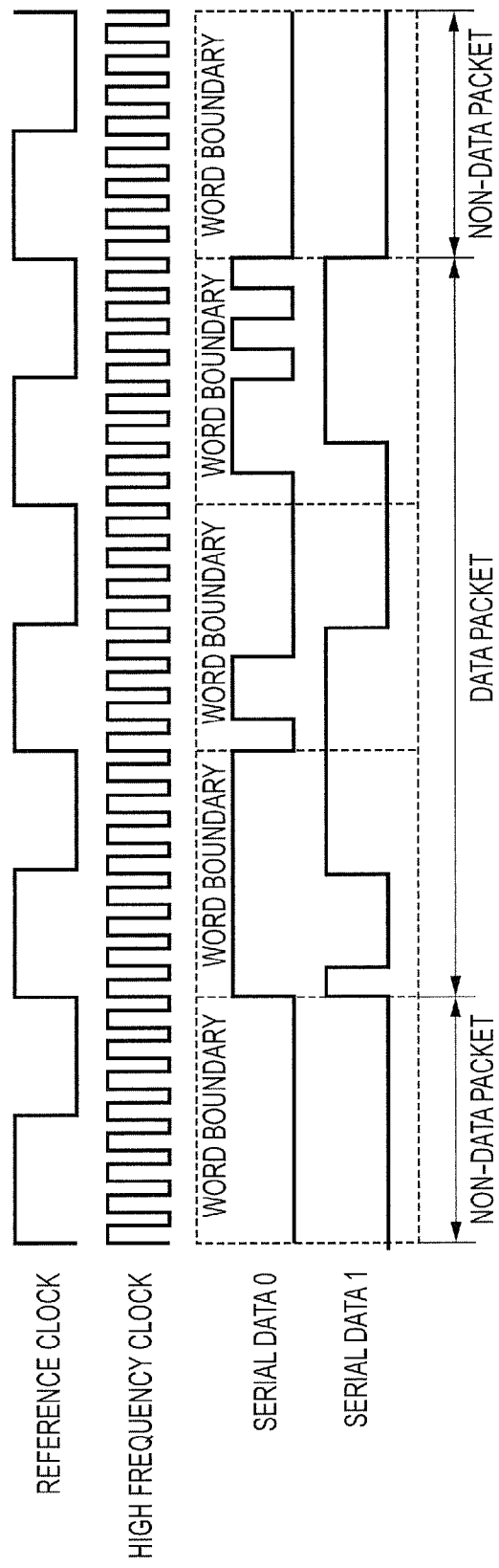
FIG. 4 is an example of a timing chart regarding the serial data transmission system in the first exemplary embodiment.

FIG. 4 is an example of a timing chart regarding the serial data transmission system in the first exemplary embodiment.

A data packet section is a section where the transmission of the data packet (48 bits) is performed, and a non-data packet section is a section where the transmission of the data packet (48 bits) is not performed. In other words, the data packet section is a section where the serial data 0 (24 bits) and the serial data 1 (24 bits) are transmitted, and the non-data packet section is a section where the serial data 0 (24 bits) and the serial data 1 (24 bits) are not transmitted.

In the non-data packet section, the serializer 104 transmits two non-data packets (8 bits) to the receiving device 20 through the serial transmission path SL1 and the serial transmission path SL2. The transmission of the two non-data packets (8 bits) is performed in parallel at timing synchronized with the high frequency clock. In FIG. 4, a case where the two non-data packets (8 bits) are equal to "00000000" will be described. However, the two non-data packets (8 bits) are not limited to "00000000". The two non-data packets (8 bits) are generated by the parallel data generation unit 103 and supplied to the serializer 104 through the parallel transmission path PL1 and the parallel transmission path PL2.

In the data packet section, the serializer 104 transmits the serial data 0 (24 bits) and the serial data 1 (24 bits) to the receiving device 20 through the serial transmission path SL1 and the serial transmission path SL2. The transmission of the serial data 0 (24 bits) and the transmission of the serial data 1 (24 bits) are performed in parallel at timing synchronized with the high frequency clock.

Figure 5:
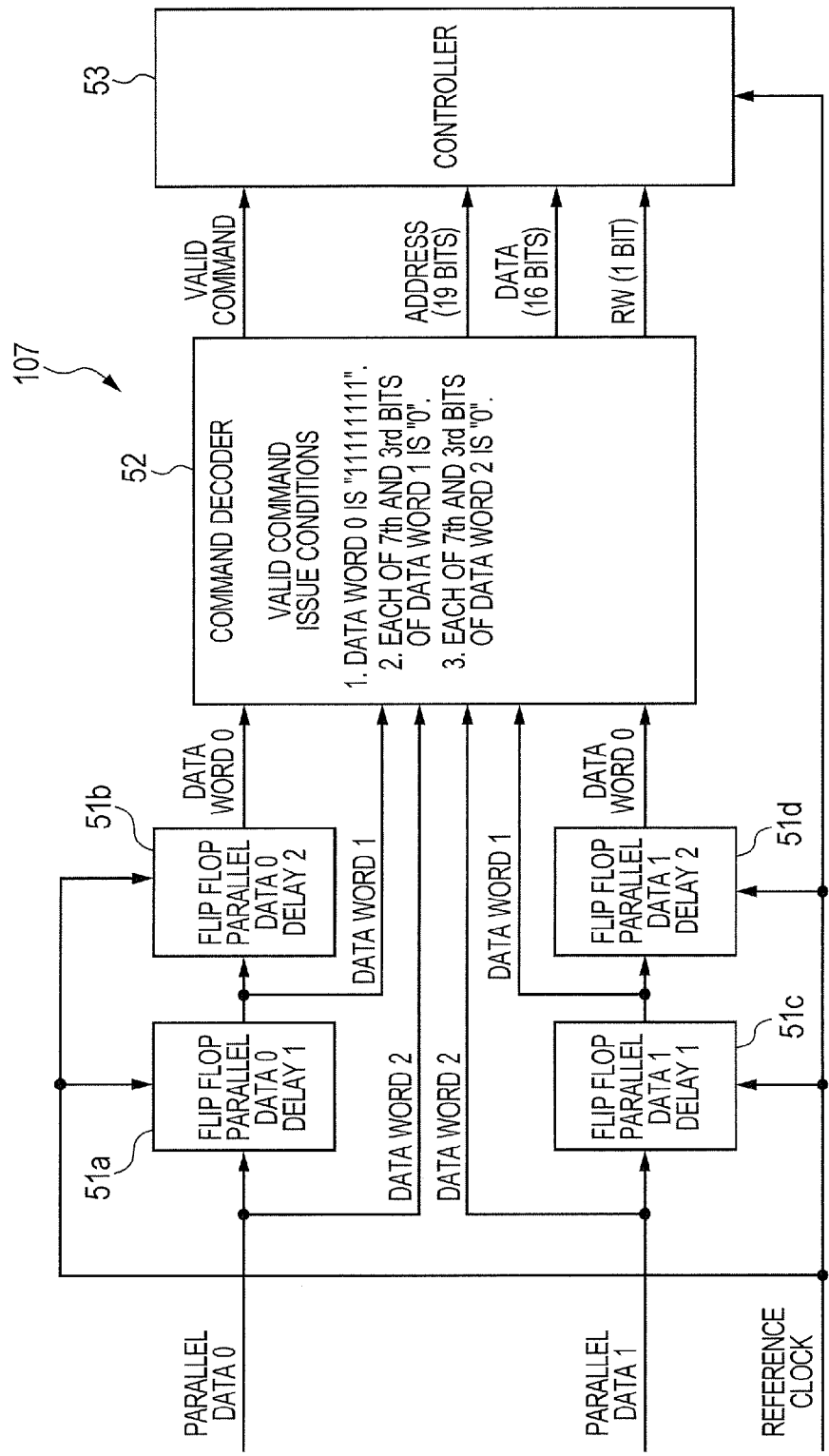
FIG. 5 is a block diagram for illustrating an example of a data processing unit in the first exemplary embodiment.

FIG. 5 is a block diagram for illustrating an example of the data processing unit 107 in the first exemplary embodiment.

The data processing unit 107 operates as a restoring circuit for restoring a data packet (48 bits) from the serial data 0 (24 bits) and the serial data 1 (24 bits). The data processing unit 107 has four flip-flops 51a to 51d, a command decoder 52, and a controller 53.

The data processing unit 107 receives the parallel data 0 and the parallel data 1 in parallel at timing synchronized with the reference clock. The flip-flops 51a and 51b delay the data word 0 (8 bits) included in the parallel data 0 by a time corresponding to two data words. The flip-flop 51a delays the data word 1 (8 bits) included in the parallel data 0 by a time corresponding to one data word. The flip-flops 51c and 51d delay the data word 0 (8 bits) included in the parallel data 1 by a time corresponding to two data words. The flip-flop 51c delays the data word 1 (8 bits) included in the parallel data 1 by a time corresponding to one data word. Thus, the data word 0 (8 bits), data word 1 (8 bits), and data word 2 (8 bits) included in the parallel data 0 and the data word 0 (8 bits), data word 1 (8 bits), and data word 2 (8 bits) included in the parallel data 1 are supplied to the controller 53 in parallel.

The command decoder 52 determines whether or not all of the conditions (1), (2), and (3) are satisfied. If all of the conditions (1) to (3) are satisfied, the command decoder 52 generates a valid command signal. If all of the conditions (1) to (3) are not satisfied, the command decoder 52 does not generate a valid command signal.

When the data word 0 (8 bits) included in the parallel data 0 is equal to "11111111", the command decoder 52 determines that the condition (1) is satisfied. The data word 0 (8 bits) included in the parallel data 0 corresponds to the packet boundary identification data (8 bits). Therefore, when the packet boundary identification data (8 bits) is equal to "11111111", the command decoder 52 determines that the condition (1) is satisfied. When the 7th and 3rd bits of the data word 1 (8 bits) included in the parallel data 0 are equal to "0", the command decoder 52 determines that the condition (2) is satisfied. When the 7th and 3rd bits of the data word 2 (8 bits) included in the parallel data 0 are equal to "0", the command decoder 52 determines that the condition (3) is satisfied.

If all of the conditions (1) to (3) are satisfied, the command decoder 52 inversely converts the parallel data 0 into the serial data 0 (24 bits), inversely converts the parallel data 1 into the serial data 1 (24 bits), and restores the data packet (48 bits) from the serial data 0 (24 bits) and the serial data 1 (24 bits). After the data packet (48 bits) is restored, the command decoder 52 extracts the data block (36 bits) from the data packet (48 bits) and extracts the RW bit (1 bit), the address (19 bits), and the control data (16 bits) from the data block (36 bits). After the RW bit (1 bit), the address (19 bits), and the control data (16 bits) are extracted, the command decoder 52 transmits the valid command signal, the RW bit (1 bit), the address (19 bits), and the control data (16 bits) to the controller 53.

The controller 53 monitors the reception of the valid command signal. If the reception of the valid command signal is detected, the controller 53 receives the RW bit (1 bit), the address (19 bits), and the control data (16 bits). The controller 53 makes a predetermined control corresponding to the control data (16 bits).

By constructing the transmitting device 10 and the receiving device 20 as mentioned above, according to the first exemplary embodiment, it will be unnecessary that a special signal line for identifying a data boundary is connected between the transmitting device 10 and the receiving device 20. Furthermore, in the two serial transmission paths between the transmitting device 10 and the receiving device 20, it is sufficient to use only one of the two serial transmission paths in order to transmit boundary information showing a boundary between the data packet (48 bits) and the non-data packet. Thus, a data transmission efficiency can be improved.

Second Exemplary Embodiment

The various kinds of functions and processings described in the first exemplary embodiment can be also realized by a personal computer, a micro computer, a CPU (Central Processing Unit), or the like by using a program. In the second exemplary embodiment, the personal computer, micro computer, CPU, or the like is called "computer X" hereinbelow. The program for controlling the computer X, that is, the program for realizing the various kinds of functions and processings described in the first exemplary embodiment is called "program Y".

The various kinds of functions and processings described in the first exemplary embodiment are realized by a method whereby the computer X executes the program Y. In this case, the program Y is supplied to the computer X through a computer-readable storage medium. The computer-readable storage medium in the second exemplary embodiment includes at least one of a hard disk device, an optical disc, a CD-ROM, a CD-R, a memory card, a ROM, a RAM, and the like. The computer-readable storage medium in the second exemplary embodiment is a non-transitory storage medium.

While the present invention has been described with reference to disclosed exemplary embodiments, it is to be understood that the present invention is not limited to the disclosed exemplary embodiments. The scope of the following claims is to be accorded the broadest interpretation so as to encompass all modifications and equivalent structures.

This application claims the benefit of Japanese Patent Application No. 2012-089417, filed Apr. 10, 2012, which is hereby incorporated by reference herein in its entirety.

What is claimed is:

1. A transmitting device comprising:
a parallel data generation unit that generates first serial data and second serial data from a data packet, converts the first serial data into first parallel data, converts the second serial data into second parallel data, transmits the first parallel data through a first parallel transmission path, and transmits the second parallel data through a second parallel transmission path, wherein the transmission of the first parallel data and the transmission of the second parallel data are performed in parallel; and
a transmitting unit that receives the first parallel data through the first parallel transmission path, receives the second parallel data through the second parallel transmission path, re-converts the first parallel data into the first serial data, re-converts the second parallel data into the second serial data, transmits the first serial data to a receiving device through the first serial transmission path, and transmits the second serial data to the receiving device through the second serial transmission path.

2. The transmitting device according to claim 1, wherein the transmission of the first serial data to the receiving device and the transmission of the second serial data to the receiving device are performed in parallel.

3. The transmitting device according to claim 1, wherein the first serial data includes boundary information indicating a boundary between the data packet and other data, and the second serial data does not include the boundary information.

4. The transmitting device according to claim 1, wherein the second serial data includes control data, and the first serial data does not include the control data.

5. The transmitting device according to claim 1, wherein the first serial data includes a part of address information indicating a predetermined area, and the second serial data includes the other portion of the address information.

6. The transmitting device according to claim 1, wherein the transmitting device is a device which acts as at least one of a digital camera and a digital video camera.

7. The transmitting device according to claim 1, wherein the transmitting device is a device which acts as a mobile phone.

8. A receiving device comprising:
a receiving unit that receives first serial data from a transmitting device through a first serial transmission path, receives second serial data from the transmitting device through a second serial transmission path, converts the first serial data into first parallel data, converts the second serial data into second parallel data, transmits the first parallel data through a first parallel transmission path, and transmits the second parallel data through a second parallel transmission path, wherein the transmission of the first parallel data and the transmission of the second parallel data are performed in parallel; and
a restoring unit that receives the first parallel data through the first parallel transmission path, receives the second parallel data through the second parallel transmission path, inversely converts the first parallel data into the first serial data, inversely converts the second parallel data into the second serial data, and restores a data packet from the first serial data and the second serial data.

9. The receiving device according to claim 8, wherein the reception of the first serial data from the transmitting device and the reception of the second serial data from the transmitting device are performed in parallel.

10. The receiving device according to claim 8, wherein the first serial data includes boundary information indicating a boundary between the data packet and other data, and the second serial data does not include the boundary information.

11. The receiving device according to claim 8, wherein the second serial data includes control data, and the first serial data does not include the control data.

12. The receiving device according to claim 8, wherein the first serial data includes a part of address information indicating a predetermined area, and the second serial data includes the other portion of the address information.

13. The receiving device according to claim 8, wherein the receiving device is a device which acts as a storage device.

14. The receiving device according to claim 8, wherein the receiving device is a device which acts as a display device.

15. A method comprising:
generating first serial data and second serial data from a data packet;
converting the first serial data into first parallel data;
converting the second serial data into second parallel data;
transmitting the first parallel data through a first parallel transmission path;
transmitting the second parallel data through a second parallel transmission path, wherein the transmission of the first parallel data and the transmission of the second parallel data are performed in parallel;
receiving the first parallel data through the first parallel transmission path;
receiving the second parallel data through the second parallel transmission path;
re-converting the first parallel data into the first serial data;
re-converting the second parallel data into the second serial data;
transmitting the first serial data to a receiving device through the first serial transmission path; and
transmitting the second serial data to the receiving device through the second serial transmission path.

16. A method comprising:
receiving first serial data from a transmitting device through a first serial transmission path;
receiving second serial data from the transmitting device through a second serial transmission path;
converting the first serial data into first parallel data;
converting the second serial data into second parallel data;
transmitting the first parallel data through a first parallel transmission path;
transmitting the second parallel data through a second parallel transmission path, wherein the transmission of the first parallel data and the transmission of the second parallel data are performed in parallel;
receiving the first parallel data through the first parallel transmission path;
receiving the second parallel data through the second parallel transmission path;
inversely converting the first parallel data into the first serial data;
inversely converting the second parallel data into the second serial data; and
restoring a data packet from the first serial data and the second serial data.

17. A non-transitory computer-readable storage medium that stores a program for causing a computer to execute the method according to claim 15.

18. A non-transitory computer-readable storage medium that stores a program for causing a computer to execute the method according to claim 16.

* * * * *